June 5, 1956      T. W. WINSTEAD      2,748,673
LINER FOR COMPOSITE CONTAINERS

Filed March 9, 1951      2 Sheets-Sheet 1

INVENTOR
Thomas W. Winstead

BY
*Semmes, Keegin, Robinson & Semmes*
ATTORNEYS

June 5, 1956 T. W. WINSTEAD 2,748,673
LINER FOR COMPOSITE CONTAINERS
Filed March 9, 1951 2 Sheets-Sheet 2
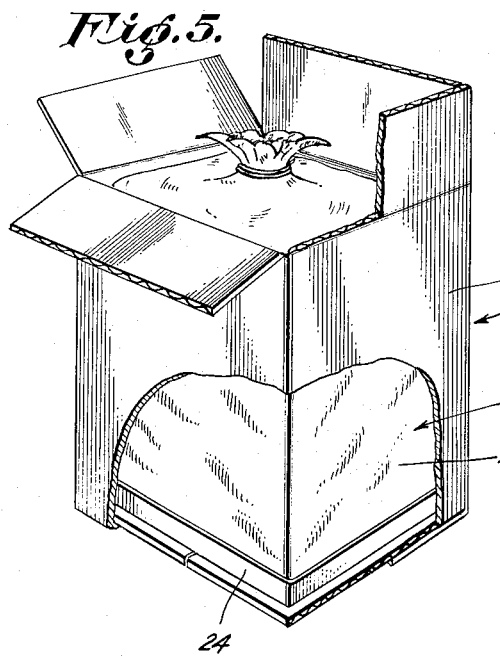
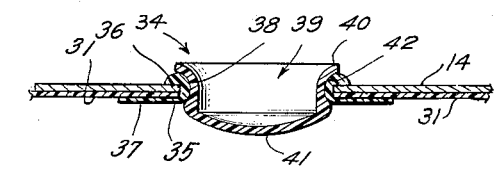
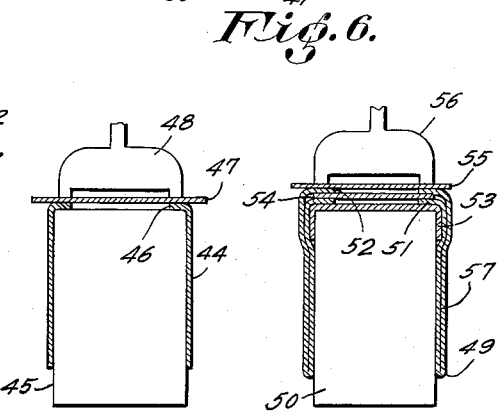
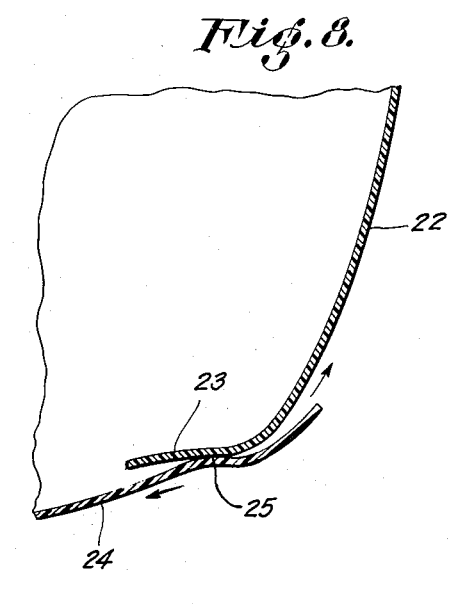
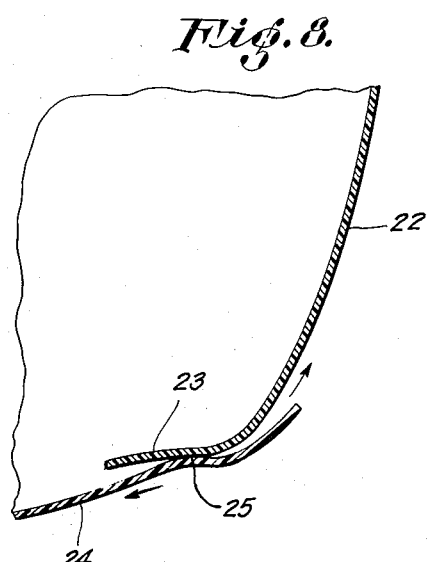
INVENTOR
Thomas W. Winstead
BY
ATTORNEYS

United States Patent Office 2,748,673
Patented June 5, 1956

2,748,673

LINER FOR COMPOSITE CONTAINERS

Thomas W. Winstead, Baltimore, Md., assignor to Hedwin Corporation, Baltimore, Md., a corporation of Maryland Application March 9, 1951, Serial No. 214,709

5 Claims. (Cl. 93—35)

This invention relates to shipping containers and more particularly to removable liners for such containers.

Numerous liquid, viscous, powdered, or granular substances, such as chemicals, paint, oil, grease, food products, and the like, frequently are shipped in bulk in containers ranging up to 50 gallons or more in capacity. Larger containers of this nature, of necessity, must be of sturdy construction not only to withstand the rough handling encountered in transit but also to avoid leakage and/or contamination of their contents. Hence, such containers usually have been in the form of wood or metal barrels or drums that are relatively heavy, and consequently expensive both to construct and to ship.

In an effort to decrease the initial and shipping costs of such containers, there recently have been developed inexpensive, lightweight composite shipping containers, having an outer body constructed of lightweight material, such as reinforced paperboard, fiberboard, etc., and an inner, impervious, removable liner. The outer body possesses sufficient structural strength to withstand rough handling while the liner prevents leakage and/or contamination of the contents. Moreover, the container body can be reused again and again with different liners without the necessity of being cleaned out, as was the case with the unitary type of shipping container. Additionally, liners of this type increase product recovery for some types of substances because the liner can be removed and all its contents expressed by hand. These and other advantageous features of liners have led to their use with all types of containers large and small, and of varying shapes, such as steel drums, corrugated cardboard boxes, plywood boxes, fiberboard and paperboard receptacles, etc.

Although the body of a composite container usually can be fabricated easily, the construction of a suitable liner presents difficulties. Flexible synthetic plastic films have proved to be the most suitable liner material because of their numerous advantageous characteristics. Among these characteristics may be mentioned substantial imperviousness and chemical inertness to most liquids, vapors, and other substances, considerable tensile strength, lack of taste or odors which would contaminate comestibles, and many other known characteristics. It is quite difficult and expensive, however, to construct a unitary seamless liner of such plastic films. Hence, liners now in use are usually in the form of a bag having its side walls formed by a tubular section of film, and its bottom formed by flattening one end of the tubular section and heat sealing the marginal edge portions together to form a straight seam. The lower portion of such a bag, obviously, does not conform to the interior of the conventional cylindrical or rectangular outer body and the resulting wrinkles and folds, when the liner is filled, cause undesirable stresses in the film which increase the hazard of tearing or breaking the liner. Moreover, the film tends to rupture adjacent the seam. In order to overcome these difficulties, the bottom of the bag is sometimes constructed by closing one end of the tubular section with a flat sheet of the film and heat healing the latter to the marginal edge portions of the tubular section to form an endles seam. The methods normally employed for constructing such seams, however, still are not successful in eliminating the undue tendency of the film to break or tear adjacent the seam.

Moreover, it frequently is desirable to ship certain substances in a completely closed liner, that is, one which is substantially liquid tight and not merely bunched and tied with a string at the top. A completely closed liner which conforms to the interior configuration of the outer body, however, must be provided with a filling aperture that can be closed liquid tight and readily reopened. Attempts to provide such an aperture in plastic films have not met with success.

Still another consideration affect the construction of removable liners. In order to prevent liners from shifting and moving about within the outer body, with resulting abrasion and likelihood of rupture, it is desirable to provide some means for detachably fastening the liner to the body.

Hence, it is an object of this invention to provide an improved plastic film liner for a composite shipping container and one which completely conforms to the interior configuration or contour of the outer body of the container.

It is another object of this invention to provide a liner of the type described which has improved seams that eliminate tendencies of the film to break or tear there adjacent.

It is still another object of this invention to provide an improved method for constructing a liner of the type described which eliminates any tendency of the film to rupture adjacent the seams.

It is still another object of this invention to provide a liner of the type described with an integral reinforcing means, or boot, for the lower portions thereof.

It is still another object of this invention to provide a completely closed liner of the type described that both conforms to the interior of the shipping container outer body and is provided with a filling or dispensing aperture having a liquid-tight detachable closure.

It is a further object of this invention to provide a completely closed liner of the type described that can easily be detachably secured to the shipping container outer body to prevent shifting of the filled liner therewithin.

Other objects and advantages of the invention will be apparent from the following description and accompanying drawings in which:

Figure 5 is a perspective view of a rectangular composite shipping container having a liner embodying this invention. A portion of the outer body is cut away to show liner details;

Figure 6 is an enlarged fragmentary sectional view of the closed liner filling and dispensing aperture and closure therefor shown in Figure 3;

Figure 7 is an enlarged fragmentary sectional view through a lower corner of a conventional liner, illustrating the seam construction;

Figure 8 is a view corresponding to Figure 7, but illustrating a seam construction embodying this invention;

Figure 9 is a diagrammatic illustration of the improved method for fabricating the lower portion of a liner embodying this invention; and Figure 10 is a diagrammatic illustration of the improved method for fabricating a completely closed liner embodying this invention.

Figure 1:
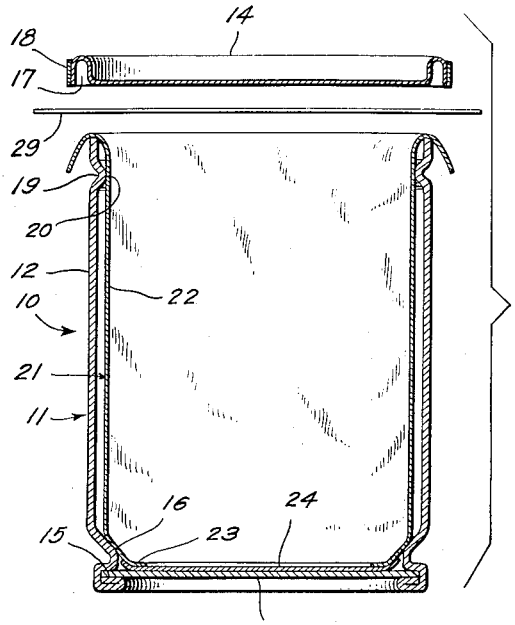
Figure 1 is a vertical, sectional, partially exploded view of a composite shipping container having a liner embodying this invention.
Figure 2:
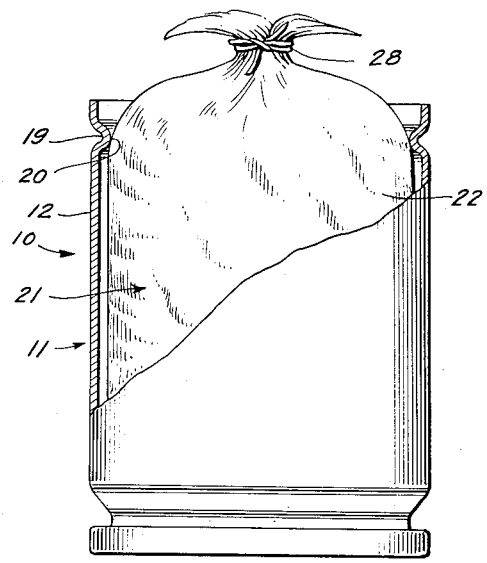
Figure 2 is an elevational view, partly in section, of a composite shipping container having another type of liner embodying this invention.
Figure 3:
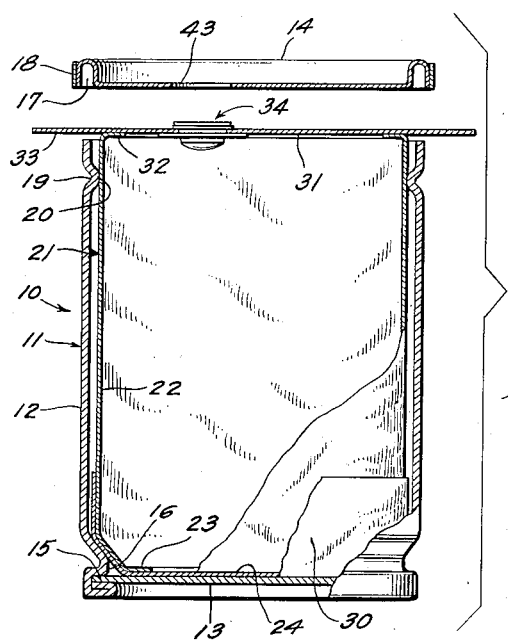
Figure 3 is a vertical sectional view corresponding to Figure 1 and illustrating a completely closed liner embodying this invention.

Referring now to the drawings, there is shown in Figures 1, 2 and 3, a typical composite shipping container 10 having an outer body 11 which includes upstanding side walls 12, a bottom 13, and removable top 14. The body 11 may be of cylindrical, rectangular, or any other desired configuration in transverse section, and made of shaped paperboard, fiberboard, etc. The lower portion of the sidewalls 12 are inturned and folded back on themselves to provide an interior shoulder 15 on which the bottom 13 is seated. The sidewalls have an exterior continuous peripheral groove adjacent their lower portions which results in a continuous interior rib 16. This rib overlaps the marginal edges of the bottom 13 to hold the latter firmly seated on the shoulder 15. Additionally, the rib 16 serves to stiffen the outer body 11. Sometimes a metal reinforcing ring or band (not shown) surrounds the lower portion of the body. The removable top 14 has a peripheral channel 17 which, when the top is pressed down, receives the upper edges of the sidewalls 12, i. e. the rim, to effect a tight closure. A clamping band 18, of conventional design, secures the top 14 to the sidewall 12. Containers of this nature usually are also provided with an exterior peripheral stiffening groove 19 and interior rib 20 adjacent the upper edges of the sidewalls.

The container 10 illustrated in Figures 1, 2 and 3 is but one example of numerous types of composite shipping containers and is shown in detail merely to point out typical areas of stress and wear on the inner liner. Therefore, it will be understood that liners embodying this invention may be employed with outer bodies formed of various materials, such as steel, corrugated cardboard, plyboard, wood, fiberboard, paperboard, etc., and constructed in various shapes, such as boxes, drums, barrels, packages, etc. For example, the plain rectangular corrugated cardboard box 11' having conventional flap closures, shown in Figure 5, is another illustration of liner usage.

An improved liner 21 of impervious flexible sheet material embodying this invention is shown in Figures 1, 2, 3, and 5. Preferred suitable materials having desirable characteristics are synthetic plastic films, such as polyethylene, polyfluorinated ethylene, polyvinylidene chloride, or similar inert flexible polymers. Films of such materials, which are basically thermoplastic, are admirably suited for use as liners and, in addition, can be sealed and bonded together by heat. The sidewalls of the liner 21 are formed by a tubular section 22 which may be seamless or formed from a flat sheet and thus have a longitudinal seam (not shown). The transverse dimensions and cross-sectional configuration of this section 22 are substantially equal to those of the outer body 11 or 11', so that the sidewalls of the liner 21 conform to and rather closely hug the interior sidewalls of the outer body. Hence, wrinkles in the liner or air pockets between the filled liner and the outer body are substantially eliminated. The lower edges of the tubular section 22 are turned inwardly to form, in effect, an endless flange 23. The bottom of the liner is formed by a flat sheet 24, of substantially the same peripheral configuration as the tubular section 22, that closes the bottom of the tubular section 22 and overlies the outer face of the flange 23. The contacting faces of the flange 23 and the sheet 24 are bonded together to form an imperforate leak-proof bottom for the liner. Preferably the dimensions of the sheet 24 are large enough to permit a substantial overlap with the flange 23.

Figure 4:
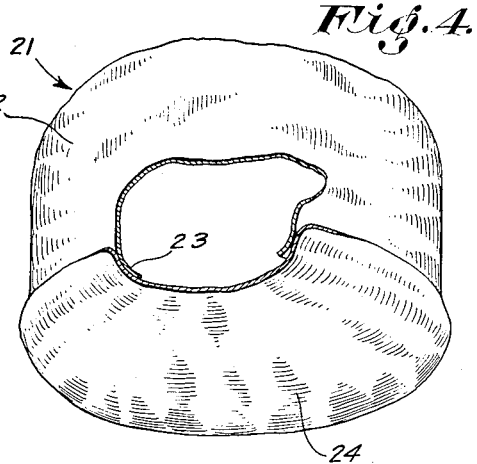
Figure 4 is a fragmentary, perspective view of the bottom portion of a cylindrical liner embodying this invention. Portions are cut away to show details more clearly.

The details of the seam 25, where the tubular section 22 and the bottom sheet 24 are bonded together, are shown in greater detail in Figure 8. It is to be noted that the seam 25 is formed between overlapping portions of the two film parts. Hence, when the liner is filled and the film parts stressed, generally in directions tending to open the seam as indicated by the arrows in Figure 8, the seam 25 is under a shear stress over its entire area. It has been found that a seam of this construction creates no tendency for the film to rupture or tear thereadjacent, as is the case with the conventional seam construction shown in Figure 7. In this latter construction the marginal edges of the parts to be bonded, that is, the tubular section 22 and the sheet 24, are not overlapped, but merely bent back to form abutting flanges 26 which are bonded along their engaging surfaces. The resulting seam 27, when the parts are stressed as indicated by the arrows in Figure 7, is in tension along the inner edge only. Seams of this nature when formed by a heat sealing operation usually do not fail before the film breaks, but the film structure shown in Figure 7 has a decided tendency to rupture immediately adjacent the seam 27. Whether this tendency is caused by the sharp bending stress imparted to the film at this location is not known. But the fact remains that an overlapped seam is far superior to an abutting flange type of seam. Liners having this type of bottom construction may be cylindrical, as shown specifically in Figure 4, rectangular, as shown specifically in Figure 5, or of any other practical shape. It is also to be noted that the peripheral edges of the bottom sheet 24 overlap the tubular section 22 exteriorly thereof. This construction reduces the tendency of the contents of the container to work between the overlapped portions of the tubular section 22 and the bottom sheet 24 and impose tension stresses on the seam 25. The above exterior overlap contruction is preferred for the reason given, but it will be understood, however, that the bottom sheet 24 can overlap the flange 23 of the tubular section interiorly thereof, i. e. the sheet 24 can overlie the inner face of the flange 23.

Closures for liners of the type under consideration may be of several types. The tie-off type shown in Figures 2 and 5, in which the liner 21 is of greater depth than the outer body 11 or 11' and the mouth of the liner is merely gathered and tied shut with cord or wire 28, is so conventional as to require no further description. The improved liner is also adapted for the disc type of closure shown in Figure 1. In this construction the mouth of a bag-like liner 21 of somewhat greater depth than the outer body 11 is folded back over the rim of the outer body and a separate disc or sheet 29 of the plastic film is placed over the open end of the bag. This sheet 29 is of greater dimensions than the rim of the outer body 11. Hence, when the top 14 is pressed down, the mouth of the bag and the sheet 29 are clamped together between the channel and the rim of the outer body 11 in tight sealing engagement about their entire peripheries. This type of a closure has advantages in that the container 10 may readily be opened and resealed at any time. Additionally, the fact that the mouth of the bag is securely held when the top 14 is in place prevents the liner from shifting or moving about unduly within the outer body 11.

In some instances, particularly in the case of free flowing substances, it is desirable to provide a completely closed liner that is provided with a combined filling aperture and pouring spout having a leak-proof detachable closure. Such a construction may be termed a closed head liner and is illustrated in Figure 3. The bottom and sidewalls of the liner 21 there shown are of substantially the same construction as those previously described. It is to be noted, however, that the bottom sheet 24 overlaps the sidewalls for a considerable distance, so that the peripheral portions of the sheet are turned back on the tubular sidewall section 22 and form an integral collar or boot 30 about the lower portion of the liner. The double liner wall, thus formed, is of particular advantage when the outer body 11 has an interior rib 16, as shown. Undue abrasion between the liner 21 and the outer body 11 is likely to occur at this point and the boot 30 serves to reinforce the liner against failure. Moreover, the boot 30 provides additional support and strength for safe handling of the filled container. It is pointed out at this point that multi-walled liner constructions, of two or more thicknesses of film in the sidewalls, bottom, or top, can be constructed whenever necessary for increased liner strength.

The top closure for the liner 21 shown in Figure 3 consists of a flat sheet 31 of film which is bonded to the inturned edges 32 of the upper end of the tubular section 22; essentially the same construction as the liner bottom. The edges of this sheet 31 extend outwardly beyond the periphery of the tubular section 22 to form an outwardly directed peripheral flange 33. This flange 33 overlies the rim of the outer body 11, so that when the top 14 is pressed down on the rim the flange 33 is clamped therebetween. Hence, the closed type of liner construction is prevented from shifting within the outer body.

The combined filling aperture and pouring spout 34 is shown best in Figure 6. A circular aperture in the closure sheet 31 has its edges reinforced by a rather thin circular fitting or bushing 35. Preferably this bushing 35 is of the same material as the liner film, only of considerably greater body or thickness. Hence, the bushing may be said to be only semi-flexible and imparts a substantial amount of strength and rigidity to the portions of the film sheet 31 surrounding the aperture. The bushing 35 is provided with an exterior, narrow, circumferential groove 36 for reasons later described. Below the groove 36 is a flat circumferential flange 37 of relatively large diameter and adapted to underlie the marginal edge portions of the film sheet 31 surrounding the aperture therethrough. The flange 37 and the film sheet 31 are bonded together, as by heat sealing, over their entire engaging surfaces. Hence, the bushing 35 is firmly secured and sealed to the top of the liner. Preferably the interior peripheral wall 38 of the bushing 35 is somewhat arcuate in cross section, as shown.

The detachable closure 39 for the liner is substantially in the shape of an open-ended shallow hollow plug having an outwardly flaring rim 40 which overlies and conforms to the outer surface of the bushing 35. The bottom 41 of the closure is substantially concavo-convex with its convex side presented to the interior of the liner. The exterior peripheral wall 42 of the closure preferably is shaped with an outwardly facing circumferential groove, also somewhat arcuate in transverse section, which snugly receives and conforms to the contour of the interior peripheral wall 38 of the bushing 35. The closure 39 preferably is made of the same material as the bushing 35 so that it also may be said to be semi-flexible. From this construction it will be seen that the closure 39 can be forced into the bushing 35 with a snap action and that pressure on the convex bottom 41 from within the liner merely serves to expand the closure into tighter engagement with the bushing. An upward pull on one side of the closure rim 40, however, effects sufficient distortion of the closure to permit its removal. In this type of liner construction, the top 14 for the outer body 11 is provided with a circular opening 43 aligned with the bushing 35 and of substantially the same diameter as the bottom of the groove 36 in the latter. The bushing 35 is adapted to be snapped into the opening 43 with the rim of the latter engaged in the groove 36. The closure 39, when in place, serves to tighten this engagement. Hence, the filling aperture and pouring spout 34 is locked to the lid or top 14 and the container may be filled or its contents discharged without removing the lid 14. It also will be noted that this construction relieves the liner of strains when inserting or removing the closure 39.

Both the disc closure and tie-off closure type of liners shown in Figures 1 and 2, respectively, can be fabricated by a novel process, diagrammatically shown in Figure 9. In this process a tubular section 44 of film, either seamless or seamed and of the desired length and cross-sectional dimensions, is pulled over a mandrel 45 to an extent which leaves only a relatively short length of the section 44 projecting from one end of the mandrel, as shown. The mandrel 45 has the same cross-sectional configuration as the interior of the outer body with which the liner being fabricated is to be used, but is of slightly larger transverse dimensions than the tubular section 44 of the film. Hence, the tubular section 44 is expanded as it is pulled over the mandrel 45. This stretching causes the walls of the projecting short length of the film to turn inwardly and overlie the end of the mandrel as indicated at 46. With the tubular section 44 thus disposed, it is a simple matter to place a film sheet 47 of the appropriate size and configuration in overlying engagement with the inturned walls 46 of the tubular section 44 and bond the two film parts together by a heat sealing operation along their overlapping portions, as by a heated die 48.

The completely closed type of liner is fabricated by a similar process, diagrammatically shown in Figure 10. In this process a tubular section 49 of the film is folded back or telescoped on itself sufficiently to align both ends of the section, thus forming a double-walled tubular section. This double-walled section is pulled over a slightly larger mandrel 50 leaving only a short length of the double-walled section, including the aforementioned aligned ends, projecting from the mandrel. As before, this stretching of the double-walled tubular section causes an inturning of both walls of the projecting length so that they overlie the end of the mandrel 50 and form, in effect an inner and an outer inwardly directed endless flange, 51 and 52, respectively. A sheet 53 of film is then disposed beneath the inner flange 51, i. e. between the inner flange and the mandrel 50, or the sheet 53 could be placed over the end of the mandrel prior to pulling the double-walled tubular section thereover. An inhibitor 54 is then placed between the contiguous surfaces of the two flanges 51 and 52 and another sheet 55 of film disposed over the outer flange 52. The inhibitor 54 is some means, such as a sheet of heat resistant paper, a suitable powder, or the like, which will separate and prevent the two flanges 52, 53 from bonding to each other when heated to bonding temperature. With the tubular section 49 and two film sheets 53 and 55 thus arranged, the two film sheets can be bonded to their corresponding flanges in a single operation by applying a suitable heated die 56 thereto. Thus, when the double-walled section 49 is stripped from the mandrel 50 the inner wall 57 can be pulled out of the open end of the double-walled section and each end of the tubular section 49 will have a sheet closure bonded thereto with overlapping seams.

It will thus be seen that the objects of the invention have been accomplished both fully and effectively by the improved liner construction and the novel method for making the same. It also will be realized that although specific embodiments of the invention have been described and illustrated, various changes therein will occur to one skilled in the art. Therefore, this invention includes all modifications which are encompassed within the spirit and scope of the following claims.

I claim:

1. The method of making a removable liner of flexible impervious synthetic polymer film for a composite shipping container, the steps comprising: uniformly expanding a tubular section of the film inwardly of one end thereof to effect uniform inturning of the unexpanded portions of the section adjacent said end to form an inwardly directed endless flange; disposing a separate sheet of the film over one side of the flange to form a closure for said end of the tubular section; and bonding said sheet to said flange along their engaging surfaces to form an endless seam.

2. The method defined in claim 1 in which the bonding step is accomplished by heat.

3. The method of making a removable closed liner of synthetic polymer film for a composite shipping container, the steps comprising: turning one end of a tubular section of the film back upon itself substantially into alignment with the other end of said section to form a double-walled tubular section; uniformly expanding the double-walled tubular section inwardly of the aligned ends to effect inturning of the unexpanded portions of the double-walled section adjacent said ends to form inner and outer, inwardly directed, substantially coextensive, uniform endless flanges; disposing a separate sheet of the film over one side of the outer flange to form a closure for one end of the tubular section and another separate sheet over one side of the inner flange to form a closure for the other end of the tubular section; and bonding each sheet to its corresponding flange along their engaging surfaces to form an endless seam.

4. The method defined in claim 3 in which the bonding step for both end closures is accomplished in a single operation by means of heat, while preventing adherence between the flanges and between the sheets.

5. The method defined in claim 3 in which the sheet disposed over the outer flange engages the outer side thereof and the sheet disposed over the inner flange engages the inner side thereof.

References Cited in the file of this patent

UNITED STATES PATENTS

| | | |
|---|---|---|
| 1,618,989 | McCumpsey | Mar. 1, 1927 |
| 2,124,231 | Kittredge et al. | July 19, 1938 |
| 2,265,075 | Knuetter | Dec. 2, 1941 |
| 2,338,604 | Silveyra | Jan. 4, 1944 |
| 2,374,793 | Waters | May 1, 1945 |
| 2,396,035 | Billing et al. | Mar. 5, 1946 |
| 2,412,544 | Waters | Dec. 10, 1946 |
| 2,485,816 | Dalsemer | Oct. 25, 1949 |
| 2,511,481 | Schneider | June 13, 1950 |

FOREIGN PATENTS

| | | |
|---|---|---|
| 57,813 | Netherlands | July 15, 1946 |